US008678928B2

(12) United States Patent
McCarthy et al.

(10) Patent No.: US 8,678,928 B2
(45) Date of Patent: Mar. 25, 2014

(54) SYSTEM AND METHOD TO DELIVER VIDEO GAMES

(75) Inventors: Mary McCarthy, San Antonio, TX (US); Tony Haeuser, Aurora, IL (US); Chris Lee, San Antonio, TX (US); Ross Cox, Cumming, GA (US); Scott Pettit, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1506 days.

(21) Appl. No.: 11/263,535

(22) Filed: Oct. 31, 2005

(65) Prior Publication Data

US 2007/0099694 A1 May 3, 2007

(51) Int. Cl.
*G06F 17/00* (2006.01)
*G06F 19/00* (2011.01)

(52) U.S. Cl.
USPC .......................................... 463/42; 463/24

(58) Field of Classification Search
USPC .......................................... 463/42, 24
See application file for complete search history.

(56) References Cited

U.S. PATENT DOCUMENTS

| | | | | |
|---|---|---|---|---|
| 5,889,506 | A | 3/1999 | Lopresti et al. | |
| 6,716,102 | B2 * | 4/2004 | Whitten et al. | 463/43 |
| 7,214,133 | B2 * | 5/2007 | Jen et al. | 463/42 |
| 7,218,739 | B2 * | 5/2007 | Multerer et al. | 380/251 |
| 7,246,155 | B2 * | 7/2007 | Maehiro | 709/217 |
| 7,512,235 | B2 * | 3/2009 | Multerer et al. | 380/251 |
| 2001/0004609 | A1 | 6/2001 | Walker et al. | |
| 2002/0019261 | A1 | 2/2002 | Hightower et al. | |
| 2002/0054088 | A1 | 5/2002 | Tanskanen et al. | |
| 2002/0095387 | A1 | 7/2002 | Sosa et al. | |
| 2002/0193162 | A1 | 12/2002 | Walker et al. | |
| 2003/0028883 | A1 | 2/2003 | Billmaier et al. | |
| 2003/0074323 | A1 | 4/2003 | Catan | |
| 2003/0115293 | A1 | 6/2003 | Fogg et al. | |
| 2003/0177187 | A1 * | 9/2003 | Levine et al. | 709/205 |
| 2003/0208767 | A1 | 11/2003 | Williamson et al. | |
| 2004/0002369 | A1 | 1/2004 | Walker et al. | |
| 2004/0097288 | A1 * | 5/2004 | Sloate et al. | 463/42 |
| 2004/0106446 | A1 | 6/2004 | Cannon et al. | |
| 2004/0107436 | A1 | 6/2004 | Ishizaki | |
| 2004/0187152 | A1 | 9/2004 | Francis et al. | |
| 2004/0198495 | A1 | 10/2004 | Cisneros et al. | |
| 2004/0225386 | A1 * | 11/2004 | Thompson et al. | 700/92 |
| 2004/0242306 | A1 | 12/2004 | Tarantino | |
| 2004/0261130 | A1 | 12/2004 | Leak et al. | |
| 2005/0005275 | A1 | 1/2005 | Stamper et al. | |

(Continued)

OTHER PUBLICATIONS

"World of Warcraft", [dated 2004]. [retrieved Sep. 9, 2012]. Retrieved from the Internet <URL:http://www.replacementdocs.com/download.php?view.2488>. 17 pages.*

*Primary Examiner* — Lawrence Galka
(74) *Attorney, Agent, or Firm* — Toler Law Group, PC

(57) ABSTRACT

The present disclosure is directed to a system and method to deliver video games. The method includes receiving a request for a game from a set-top box device. The method also includes determining whether at least one user identity is associated with the set-top box device. The method also includes retrieving previous game information associated with the at least one user identity. The method can also include providing the previous game information to the set-top box device and allowing at least one user to continue a previously executed game in response to a user selection at least partially based on the previous game information.

24 Claims, 10 Drawing Sheets

(56) References Cited

U.S. PATENT DOCUMENTS

| | | | | |
|---|---|---|---|---|
| 2005/0028206 | A1 | 2/2005 | Cameron et al. | |
| 2005/0050218 | A1 | 3/2005 | Sheldon | |
| 2005/0060584 | A1 | 3/2005 | Ginter et al. | |
| 2005/0097213 | A1 | 5/2005 | Barrett et al. | |
| 2005/0149986 | A1 | 7/2005 | DorEl | |
| 2005/0153760 | A1 | 7/2005 | Varley | |
| 2005/0210510 | A1 | 9/2005 | Danker | |
| 2006/0123455 | A1 * | 6/2006 | Pai et al. | 725/133 |
| 2007/0005704 | A1 * | 1/2007 | Heron et al. | 709/206 |

* cited by examiner

SYSTEM AND METHOD TO DELIVER VIDEO GAMES

FIELD OF THE DISCLOSURE

The present disclosure relates generally to delivering video games.

BACKGROUND

Playing video games is a popular form of entertainment. Home video game systems allow users to enjoy high-quality game play on a television monitor or other display device without going to an arcade. For example, users can purchase individual hardware units that can be used to play a variety of games. Personal computers and laptops also allow users to play a variety of video games. Additionally, these computing devices allow users to receive games over the Internet and to participate in Internet gaming sessions with many other users.

Unlike arcades, home video game systems do not require a user to pay each time they play a game. Thus, users who play video games at home have fewer limitations on how long or how many games they play. Additionally, many users prefer to continue a game from a previously saved version of the game. Constraints on memory media can limit the amount of information from previous games that can be saved on home gaming systems. Internet-based games can provide prior game information, but it can be difficult to access and play Internet-based games from televisions. Further, users may have to enter authentication information to receive information related to their performance in previous games.

DETAILED DESCRIPTION OF THE DRAWINGS

A system to deliver video games is disclosed and includes a server having a processor and a memory accessible to the processor. A computer program is embedded in the memory and includes instructions to receive a request for a game from a set-top box device. The computer program also includes instructions to retrieve previous game information associated with at least one user identity associated with the set-top box device. The computer program also includes instructions to authorize at least one user to continue the game at least partially based on the previous game information.

In another embodiment, a method of delivering video games is disclosed and includes receiving a request for a game use from a set-top box device. The method includes receiving a request for a game from a set-top box device. The method also includes determining whether at least one user identity is associated with the set-top box device. The method also includes retrieving previous game information associated with the at least one user identity. The method can also include providing the previous game information to the set-top box device and allowing at least one user to continue a previously executed game in response to a user selection at least partially based on the previous game information.

In another embodiment, a method of delivering video games is disclosed and includes receiving a request for a game, where the request is identified by a first user identity associated with a set-top box device. The method also includes receiving a selection to play the game in an online room with a plurality of additional players. The method also includes retrieving previous game information associated with the first user identity and with additional user identities associated with the plurality of additional players. The method also includes providing the previous game information to the set-top box device. The method can also include continuing the game based on the previous game information.

In another embodiment, a method of receiving video games is disclosed and includes requesting a game. The method also includes receiving information from at least one previous game. The method also includes displaying the information from the at least one previous game at a display device. The information from the at least one previous game use is associated with at least one user identity associated with a set-top box device.

Figure 1:
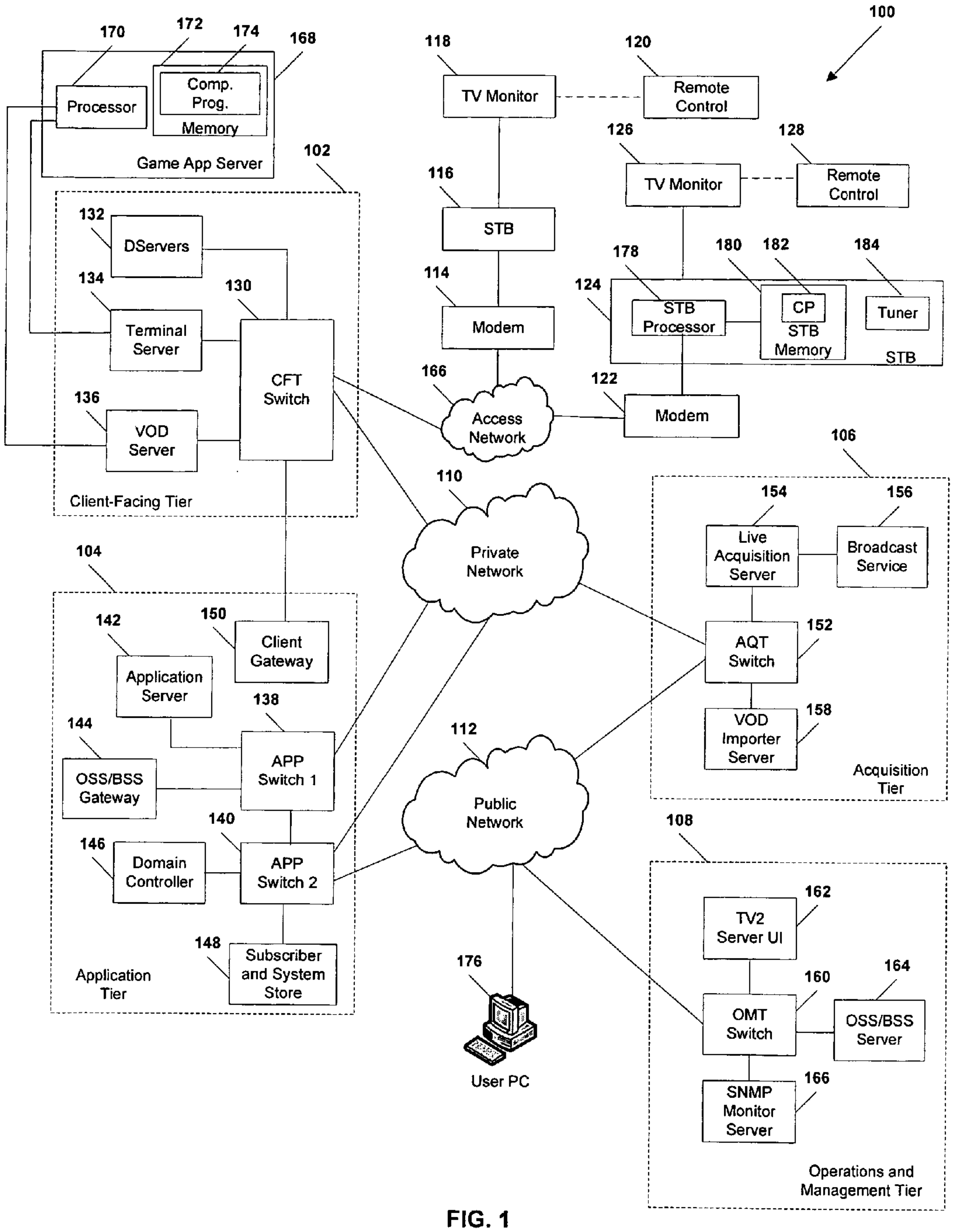
FIG. 1 is a block diagram illustrating an embodiment of an Internet Protocol Television (IPTV) system.

Referring to FIG. 1, an IPTV system is shown and is generally designated 100. As shown, the system 100 can include a client facing tier 102, an application tier 104, an acquisition tier 106, and an operations and management tier 108. Each tier 102, 104, 106, 108 is coupled to a private network 110, a public network 112, or both the private network 110 and the public network 112. For example, the client-facing tier 102 can be coupled to the private network 110. Further, the application tier 104 can be coupled to the private network 110 and to the public network 112, such as the Internet. The acquisition tier 106 can also be coupled to the private network 110 and to the public network 112. Moreover, the operations and management tier 108 can be coupled to the public network 112.

As shown in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

As illustrated in FIG. 1, the client-facing tier 102 can communicate with user equipment via a private access network 166, such as an Internet Protocol Television (IPTV) network. In an illustrative embodiment, modems, such as a first modem 114 and a second modem 122 can be coupled to the private access network 166. The client-facing tier 102 can communicate with a first representative set-top box device

116 via the first modem 114 and with a second representative set-top box device 124 via the second modem 122. The client-facing tier 102 can communicate with a large number of set-top boxes, such as the representative set-top boxes 116, 124, over a wide geographic area, such as a regional area, a metropolitan area, a viewing area, or any other suitable geographic area that can be supported by networking the client-facing tier 102 to numerous set-top box devices.

In one embodiment, the client-facing tier 102 can be coupled to the modems 114, 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the private access network 166, via an IPTV software platform, such as Microsoft® TV IPTV Edition.

Additionally, the first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128.

In an exemplary, non-limiting embodiment, each set-top box device 116, 124 can receive data or video from the client-facing tier 102 via the private access network 166 and render or display the data or video at the display device 118, 126 to which it is coupled. In an illustrative embodiment, the set-top box devices 116, 124 can include tuners, such as the tuner 184 shown in FIG. 1, that receive and decode television programming information for transmission to the display devices 118, 126. Further, the set-top box devices 116, 124 can include a STB processor 178 and a STB memory device 180 that is accessible to the STB processor 178. In a particular embodiment, the set-top box devices 116, 124 can also communicate commands received from the remote control devices 120, 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server 168 and other devices with a common connection point to the private network 110. In a particular embodiment, the CFT switch 130 can also be coupled to a video-on-demand (VOD) server 136.

As shown in FIG. 1, the application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116, 124 via the private access network 166, so the set-top box devices 116, 124 can provide functions, such as display, messaging, processing of IPTV data and VOD material, etc. In a particular embodiment, the OSS/BSS gateway 144 includes operation systems and support (OSS) data, as well as billing systems and support (BSS) data.

Further, the second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116, 124 can access the system via the private access network 166, using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the private access network 166.

For example, when a set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/B SS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, e.g., because it is connected to a different twisted pair, the client gateway 150 can deny transmissions to and from the set-top box device 116 beyond the private access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 can transmit the television content to the AQT switch 152, in turn, and the AQT switch 152 can transmit the television content to the CFT switch 130 via the private network 110. Further, the television content can be encoded at the D-servers 132, and the CFT switch 130 can communicate the television content to the modems 114, 122 via the private access network 166. The set-top box devices 116, 124 can receive the television content from the modems 114, 122, decode the television content, and transmit the content to the display devices 118, 126 according to commands from the remote control devices 120, 128.

Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When a user issues a request for VOD content to a set-top box device 116, 124, the request can be transmitted over the private access network 166 to the VOD server 136, via the CFT switch 130. Upon receiving such a request, the VOD server 136 can retrieve requested VOD content and transmit the content to the set-top box device 116,124 across the private access network 166, via the CFT switch 130.

In an illustrative embodiment, the live acquisition server 154 can transmit the television content to the AQT switch 152, and the AQT switch 152, in turn, can transmit the television content to the OMT switch 160 via the public network 112. In this embodiment, the OMT switch 160 can transmit the television content to the TV2 server 162 for display to users accessing the user interface at the TV2 server 162. For example, a user can access the TV2 server 162 using the computer 176 coupled to the public network 112.

As shown in FIG. 1, the system 100 can include a game application server 168. The game application server 168 includes a processor 170 and a memory device 172 that is accessible to the processor 170. The game application server 168 also includes a computer program 174 that is embedded within the memory device 172. In a particular embodiment, the computer program 174 can include instructions to receive a request for a game from a set-top box device 116, 124. In an illustrative embodiment, the game can be selected by the user from a plurality of game applications that reside in the memory 172 of the game application server 168.

In a particular embodiment, the computer program 174 can include instructions to retrieve previous game information associated with at least one user identity that is associated with the set-top box device 116 or 124. For example, the computer program 174 can include instructions to query the subscriber and system store 148 via the private network 110 for account information associated with the first set-top box device 116. In an illustrative embodiment, the account information can include one or more user identities that have been created by users at the set-top box device 116. These user identities can be used by the game application server 168 to associate previous game information, such as scores or levels of play that each identified user has attained within the game, with particular users. The computer program 174 can also include instructions to provide the previous game information to the set-top box device and to allow one or more users to continue a game based on the previous game information.

In a particular embodiment, the game application server 168 can be coupled to the terminal server 134. The game application server 168 runs one or more game applications and can communicate data to the first set-top box device 116, for example, by transmitting the data to the terminal server 134. The terminal server 134 transmits the data across the private access network 166, via the CFT switch 130, to the first modem 114 that is coupled to the first set-top box device 116. Additionally, users can issue commands to the first set-top box device 116, which the set-top box device 116 transmits across the private access network 166 via the first modem 114 to the CFT switch 130. The CFT switch 130 transmits these commands to the terminal server 134, which transmits them to game application server 168. In this embodiment, a game requested by a user is operated entirely on the game application server 168. The game application server 168 processes and executes commands received from users and transmits data corresponding to updated or new displays to the set-top box devices 116, 124. Moreover, the set-top box devices 116, 124 process the data and render the corresponding display on the display devices 118, 126 to which they are coupled.

In another embodiment, the game application server 168 can be coupled to the VOD server 136. Moreover, the game application server 168 can execute one or more game applications and can communicate video to the first set-top box device 116, for example, by transmitting the data to the VOD server 136. The VOD server 136 can transmit the data across the private access network 166, via the CFT switch 130 to a modem 114, 122 that is coupled to a set-top box device 116, 124. Additionally, users can issue commands to a set-top box device 116, 124 and the set-top box device 116 can transmit the commands across the private access network 166 via the first modem 114 to the CFT switch 130. The CFT switch 130 transmits these commands to the VOD server 136, which transmits them to game application server 168. In this embodiment, a game requested by a user is operated entirely on the game application server 168. The game application server 168 processes and executes commands received from users and transmits video content of updated or new displays to a set-top box device 116, 124. Moreover, a set-top box device 116, 124 can transmit the video content associated with a game to a display device 118, 126 coupled thereto.

In yet another embodiment, the game application server 168 can communicate with a set-top box 116, 124 via the private access network 166. A requested game can be downloaded to a set-top box 116, 124, such that the game is operated and user commands are processed at the set-top box device 116, 124. In this embodiment, only performance data is communicated back to the game application server 168, in conjunction with, or independently of, the game application. In an alternative embodiment, individual levels, missions or game states can be downloaded from the game application server 168 to the set-top box device 116, 124. In this embodiment, new levels, etc., are downloaded upon the completion of previous ones.

Figure 2:
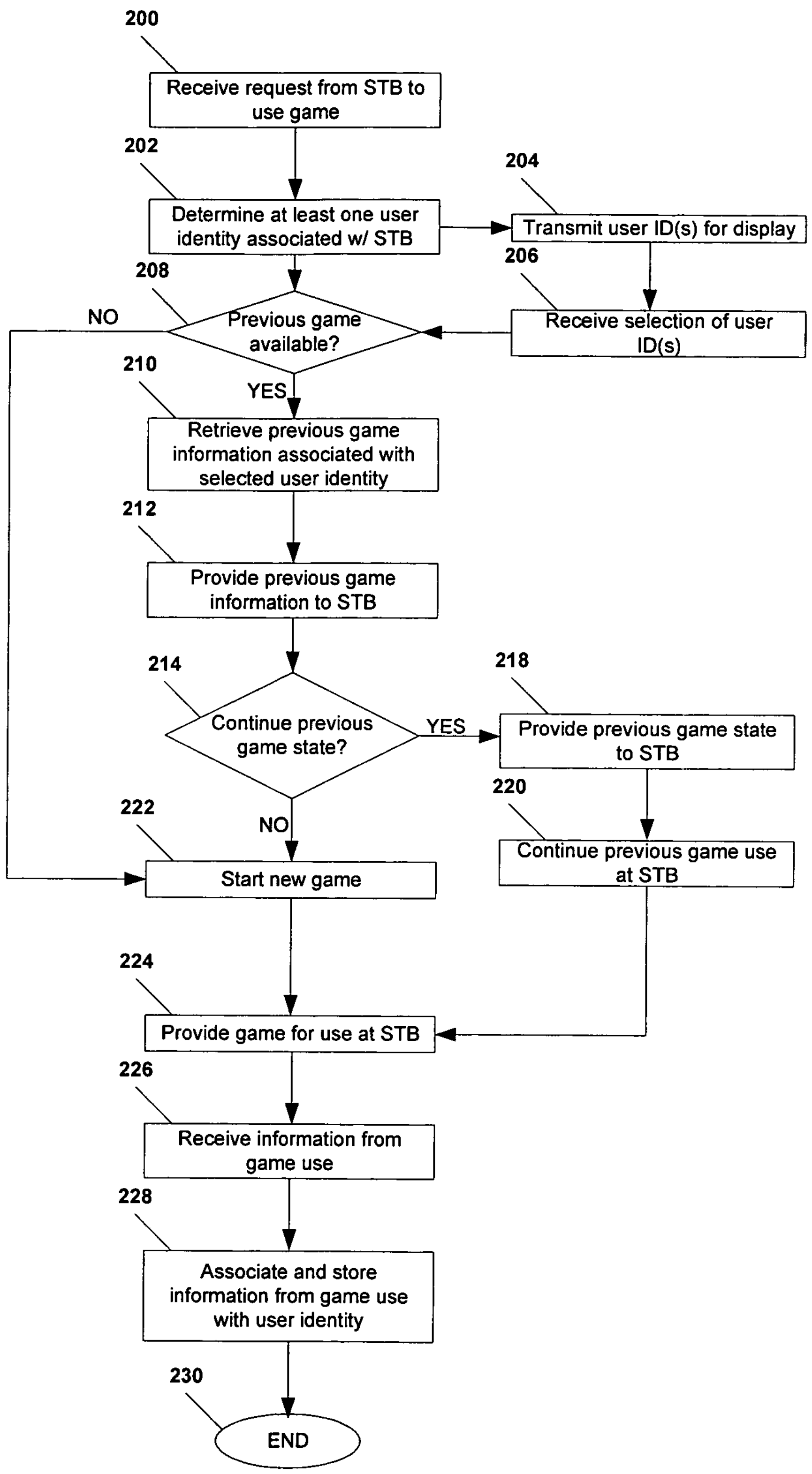
FIG. 2 is a flow diagram illustrating an embodiment of a method of delivering video games via an IPTV system.

Referring to FIG. 2, a method of delivering video games is shown. At block 200, a request to use a game application is received from a set-top box device. In a particular embodiment, a user can issue the request to a server, such as a game application server, via a set-top box device. At block 202, at least one user identity is determined to be associated with the set-top box device. In an illustrative embodiment, the game application server can query an information store that stores user identities via user accounts that correspond to various set-top box data. For example, where the server and set-top box device communicate over an IP network, the information store can include IPTV account information that is associated with an IP address of the set-top box device, data identifying a twisted pair connected to the set-top box device, an alpha-numeric identifier of the set-top box device, other data that is suitable for associating a set-top box device with a user account, or any combination of these.

In an illustrative embodiment, the user identities associated with the set-top box device can be transmitted from the game application server to the set-top box device, at block 204, and can be displayed via a display device, such as a television monitor. In this embodiment, a selection of a user identity can be received by the game application server from the set-top box device, at block 206. In a particular embodiment, a selection of one or more additional user identities can also be received. For example, where two of the transmitted user identities played, but did not complete, a video chess game or a two-player version of Space Invaders, both players may wish to continue the previous game. In this example, two of the transmitted user identities would be selected.

Moving to decision step 208, it can be determined whether a previous game is available for the selected user identity. In a particular embodiment, a computer program embedded within the game application server can include instructions to make this determination. If no previous games are available for the selected user identity, a new game can be started at block 222. If one or more previous games are available for the selected user identity, the game application server can retrieve information from the previous game(s), at block 210. Further, the information from the previous game(s) can be provided from the game application server to the set-top box device at block 212. Previous game information can include scores, levels, game states, and the like, which indicate past performance of the selected user identity in the requested game. For example, previous game information can indicate that a user attained a score of 10,000 in a previous game; passed level 6 in a previous game; partially completed a mission in a previous game; had the second most poker chips in a previous game; and the like.

Prior game information can help the user to determine whether to continue a previous game or start a new game. In an illustrative embodiment, previous game information can include information for games played by a user during a certain time period, such as information for previous games played in the last fourteen days. In another illustrative embodiment, previous game information can include information for a certain number of previous games played by a user, such as the last five games played by the user.

In an illustrative embodiment, a user can be prompted at decision step 214 in order to determine whether the user wants to continue the previous game, e.g., based on the previous game information. When the user chooses to not continue a previous game, a new game can be started in any of the manners disclosed, as shown at block 222. Conversely, when the user chooses to continue a previous game, the method proceeds to block 218, and the selected prior game state can be provided to the set-top box device. At block 220, the game is continued from the prior game state. For example, if a user completed a portion of level 6 in a mahjong game, and the user selected to continue that mahjong game, then the user would be returned to level 6 at a point immediately after the most recent play in that particular mahjong game.

Once it has been determined whether the user wishes to continue a previous game or start a new game, the game is provided by the game application server for use at the set-top box device, as shown at block 224. While the game is played and after the game is over, information, such as scores, levels, and game states, is received by the game application server from the set-top box device, at block 226. At block 228, the game application server associates and stores information from the game use in conjunction with the user identity that requested the game. In an illustrative embodiment, this information can be stored in conjunction with the user identity within the game application, itself. In another illustrative embodiment, this information can be stored in conjunction with the user identity within an information store that is coupled to or embedded in the game application server. The method terminates at state 230.

Both new and previous games can be delivered from the game application server to the set-top box device in a variety of ways. For example, the game application can be operated at the game application server, such that game commands issued by a player to the set-top box device are received and executed at the game application server. In this embodiment, the set-top box device can operate essentially like a terminal that receives video content from the game application for display at a display device. Game information, such as scores and the like, are calculated and stored at the game application server.

Alternatively, a copy or version of a game application can be downloaded to the set-top box device, such that the operation of the game application and the execution of all commands received from the player occur at the set-top box device. In this alternative embodiment, game information is calculated at the set-top box device and transmitted to the game application server for storage or for transmission to an information store. The information can also be stored directly at the set-top box device prior to and/or after transmission to the game application server.

In another embodiment, the game application server can transmit a portion of a game application to the set-top box device. For example, the game application server can transmit a single level of a mahjong game or a certain mission from a first-person shooter game. Commands received from a player for the portion of the game application are executed at the set-top box device. Once a player has completed the level or mission, performance data can be transmitted to the game application server, and the next level or mission can be downloaded to the set-top box device.

In yet another embodiment, the game application can be operated at the server, such that only commands and data are transmitted between the game application server and the set-top box device. In this embodiment, data associated with displaying the game can be transmitted to the set-top box device. The set-top box device can process the data via a computer program embedded within a memory portion of the set-top box device and render video associated with the game, based at least partially on the data received from the server. Game information, such as scores and the like, are calculated and stored at the game application server.

Figure 3:
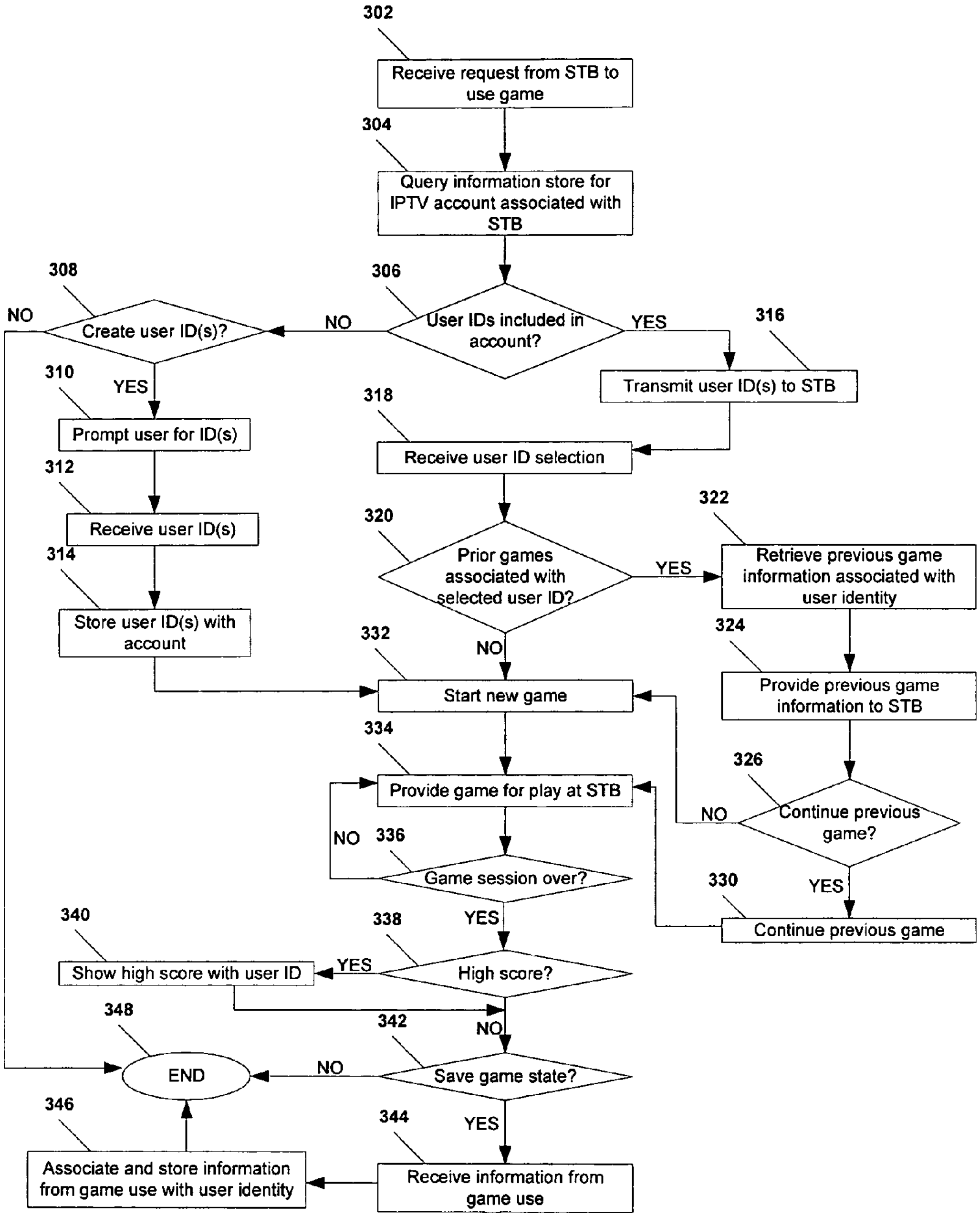
FIG. 3 is a flow diagram illustrating a second embodiment of a method of delivering video games via an IPTV system.

Referring to FIG. 3, a second embodiment of a method of delivering video games is shown. At block 302, a request to use a game application is received from a set-top box device. For example, a user can issue the request via the set-top box device to a server, such as a game application server, that communicates with the set-top box device over a network. Moving to block 304, the game application server can query an information store for an account that is associated with the set-top box device. The information store can be coupled to or embedded within the game application server, or the game application server can communicate with the information store via a network.

In an illustrative embodiment, the game application server and set-top box device can communicate over an Internet Protocol Television (IPTV) network. In this embodiment, the information store can associate account information maintained by an IPTV service provider with the set-top box device, such as a user account number, data identifying a twisted pair connected to the set-top box device, an alphanumeric identifier of the set-top box device, any other data that is suitable for associating a set-top box device with a user account, or any combination of these. The information store can provide the account information to the game application server in response to a query for information associated with the set-top box device that has requested the game.

In a particular embodiment, at decision step 306, it is determined whether the account associated with the set-top box device includes any user identities. In a particular embodiment, a computer program embedded within the game application server can include instructions to make this determination. If the account does not include any user identities, the method continues to decision step 308, and the user is prompted to create one or more user identities for the account. If the user does not want to create any user identities, the method terminates at state 348. On the other hand, if an indication to create one or more user identities is received at the game application server from the set-top box device, the user can be prompted for one or more user identities, as shown at block 310. The one or more user identities can be received at the game application server from the set-top box device at block 312 and can be stored at block 314. The user identities can be stored by the game application server or at an information store coupled to or embedded in the game application server. Thereafter, the method moves to block 332, and a new game can be started at block 334, in any of the manners disclosed.

Returning to decision step 306, if it is determined that one or more user identities are included in or associated with the account, the method proceeds to block 316, and the user identities can be transmitted by the game application server to the set-top box device for display at a display device, such as a television monitor. Moving to block 318, a selection of a particular user identity, from the user identities transmitted to the set-top box device, is received by the game application server from the set-top box device. In a particular embodiment, a selection of one or more additional user identities can also be received from the set-top box device.

Moving to decision step 320, it is determined whether previous games are associated with the selected user identity. In a particular embodiment, a computer program embedded within the game application server can include instructions to make this determination. If no previous games are associated with the selected user identity, the method continues to block 332, and a new game is started in any of the manners disclosed. Conversely, if one or more previous games are associated with the selected user identity, the method proceeds to block 322, and information from the previous games associated with the selected user identity is retrieved. In a particular embodiment, the previous game information can be retrieved from the game application. At block 324, the previous game information is communicated from the game application server to the set-top box device.

Previous game information can include scores, levels, game states, and the like, which indicate past performance of the selected user identity in the requested game. For example, previous game information can indicate that a user attained a score of 10,000 in a previous game; passed a particular skill level in a previous game; partially completed a mission in a previous game; had the second most poker chips in a previous game; and the like. Prior game information can help the user to determine whether to continue a previous game or start a new game. In an illustrative embodiment, previous game information can include information for games played by a user during a certain time period, such as information for previous games played in the last fourteen days. In another illustrative embodiment, previous game information can include information for a certain number of previous games played by a user, such as the last five games played by the user.

Proceeding to decision step 326, the user is prompted with an option to continue the previous game(s) associated with the previous game information. For example, the user can be given the choice to continue a previous game or to start a new game. In a particular embodiment, the user can be prompted with a list of one or more previous games and can be prompted to choose whether to start a new game or to restart a particular prior game from the list. If the user selects the option to continue a previous game, the method then continues to block 330, and the selected previous game is continued. For example, if a user completed a portion of the third mission in a first-person shooter game, and the user selected to continue that game, then the user would be returned to the third mission at a point immediately after the most recent play in that game or to a point at which the user saved the game state. If the user does not select the option to continue a previous game, a new game is started at block 332, in any of the manners disclosed.

After the user indicates whether to continue a previous game or start a new game, the method continues to block 334, and the previous game or new game is provided for play at the set-top box device. In a particular embodiment, at decision step 336, the game state is monitored and it is determined whether the new or continued game is over. When the game is not over, the method returns to block 334, and game play continues. Alternatively, when the game is over, the method proceeds to decision step 338, and it is determined whether the final score of the game is a high score for the user or for all users. If the final score is not a high score for the user or for all users, the method proceeds to decision step 342, and it is determined whether the game state from the game should be saved in conjunction with the user identity. In a particular embodiment, the user is prompted in order to determine whether to save the game. Alternately, the game can include a user-selectable setting that indicates that all games are to be saved after completion.

At decision step 342, if the user does not want to save the game state, the method terminates at state 348. On the other hand, if the user wants to save the game state, the method moves to block 344, and game state information is received at the game application server from the set-top box via a network. This information, which can include scores, levels, game states, and the like, is associated with the user identity and stored at block 346. In an illustrative embodiment, this information can be stored with the user identity by the game application, itself. In another illustrative embodiment, this information can be stored in conjunction with the user identity within an information store that is coupled to or embedded in the game application server. The method terminates at state 348.

Figure 9:
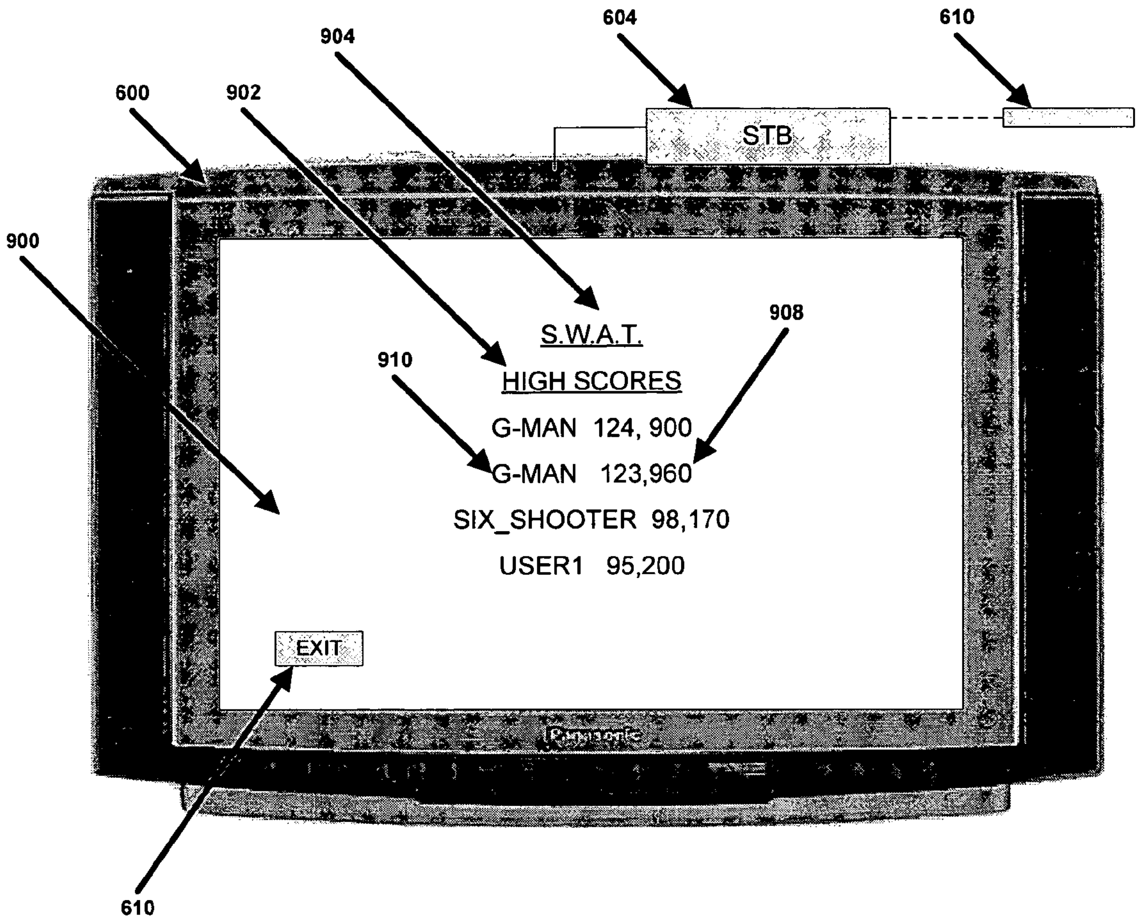
FIG. 9 is a diagram illustrating a fourth embodiment of a user interface to receive video games via an IPTV system.

Returning to decision step 338, when the final score is a high score for the user or for all users, the method proceeds to block 340 and the high score is displayed with the user identity, as shown further in FIG. 9. Thereafter, the method proceeds to decision step 342 and continues as described.

Figure 4:
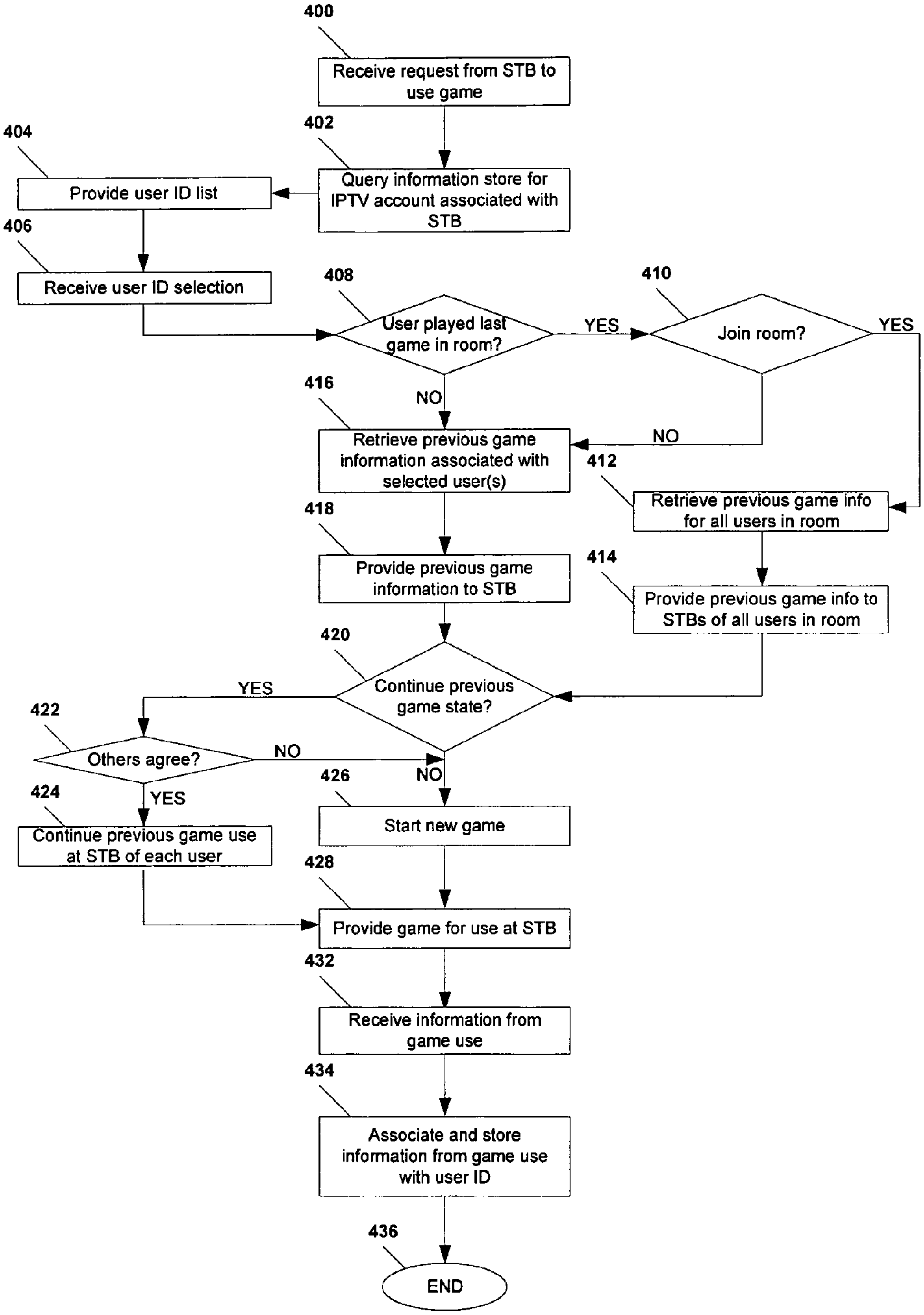
FIG. 4 is a flow diagram illustrating a third embodiment of a method of delivering video games via an IPTV system.

Referring to FIG. 4, a third embodiment of a method for delivering video games is shown. At block 400, a request to use a game application is received from a set-top box device. For example, a user can issue the request via the set-top box device to a server, such as a game application server, that communicates with the set-top box device over a network. In a particular embodiment, at block 402, the game application server can query an information store for an account that is associated with the set-top box device. The information store can be coupled to or embedded within the game application server, or the game application server can communicate with the information store via a network.

In an illustrative embodiment, the game application server and the set-top box device can communicate over an Internet Protocol Television (IPTV) network. In this embodiment, the information store can associate account information maintained by an IPTV service provider with the set-top box device, such as a user account number, data identifying a twisted pair connected to the set-top box device, an alphanumeric identifier of the set-top box device, any other data that is suitable for associating a set-top box device with a user account, or any combination of these. The information store can provide the account information to the game application server in response to a query for information associated with the set-top box device that has requested the game.

In a particular embodiment, each account can include one or more user identities that the user has created. Moving to block 404, the game application server can provide a list of user identities to the set-top box device for display at a display device, e.g., a television monitor. At block 406, a selection of a particular user identity from the list is received at the game application server from the set-top box device. At decision step 408, it is determined whether the user with the selected user identity previously played the requested game in a room. In a particular embodiment, a computer program embedded within the game application server can include instructions to make this determination. A room can include an online forum in which multiple users can play a game simultaneously and compete against each other or as a team, while communicating via either separate set-top box devices or the same set-top box device.

If it is determined that the user did not previously play the requested game in a room, the method proceeds to block 416, and the game application server retrieves information from one or more previous games that are associated with the selected user. In a particular embodiment, the previous game information can be retrieved from the game application. At block 418, the previous game information is communicated from the game application server to the set-top box device for display at a display device.

Previous game information for a user not playing within a room can include scores, levels, game states, and the like, which indicate past performance of the selected user identity in the requested game. For example, previous game information can indicate that a user attained a score of 10,000 in a previous game; passed a certain skill level in a previous game; partially completed a mission in a previous game; had the second most poker chips in a previous game; and the like. Prior game information can help the user to determine whether to continue a previous game or start a new game. In an illustrative embodiment, previous game information can include information for games played by a user during a certain time period, such as information for previous games played in the last fourteen days. In another illustrative embodiment, previous game information can include information for a certain number of previous games played by a user, such as the last five games played by the user.

Alternatively, at decision step 408, when it is determined that the selected user previously played the requested game in a room, the method proceeds to decision step 410 and the selected user can be given the choice of playing the game in the room again. If the user chooses to not play the game within the room, the method proceeds to block 416. Returning to decision step 410, when the user chooses to join the room, the method proceeds to block 412, and information is retrieved from a previous game associated with all users in the room. This information can be provided to the set-top box device at block 414. In a particular embodiment, the additional players also have user identities that can be associated with other set-top box devices. For example, each additional player can request the game from a separate set-top box device and choose to join the same room. Information for one or more previous games played by all players in the room can then be provided to the set-top box device of each player. In this way, all players in the room can see the previous performance of all players in the room, while using separate set-top box devices.

Previous game information for users playing within a room can include scores, levels, game states, and the like, which indicate past performance of users in the room in the requested game. For example, previous game information can indicate the score that each user in the room attained; the level that each user or team of users completed in a previous game; the mission that each user or team of users had partially completed in a previous game; the number of poker chips that each player had in a previous game; and the like. Prior game information can help the users to determine whether to continue a previous game or start a new game. In an illustrative embodiment, previous game information can include information for games played by users in the room during a certain time period, such as information for previous games played in the last fourteen days. In another illustrative embodiment, previous game information can include information for a certain number of previous games played by users in the room, such as the last five games played by the users.

Moving to decision step 420, it is determined whether to continue a previous game for which information has been provided. For example, the selected user can be given the choice to continue a previous game or to start a new game. In a particular embodiment, if the user decides to continue a previous game, the method proceeds to decision step 422, and other users in the room can be prompted to agree to continue the previous game. When the other users agree to continue the previous game, the method moves to block 424, and the previous game is continued. Further, the previous game is provided for use at-block 428. Returning to decision step 422, if the user decides not to continue a previous game, a new game is started at block 426. Additionally, at decision step 422, if one or more other users decide not to continue a previous game, a new game is started at block 426.

After the user decides whether to continue a previous game or start a new game, the method continues to block 428 and the game is provided for use at the set-top box device. While the game is played and after the game is over, information, such as scores, levels, and game states, may be received at a remote network site from the set-top box device, at block 430. At block 432, the information from the game use is associated with the user identity of the user that requested the game and this information is stored. In an illustrative embodiment, this information can be stored in conjunction with the user identity by the game application. In an illustrative embodiment, this information can be stored by an information store that is coupled to or embedded within the network game application server. The method terminates at state 434.

Figure 5:
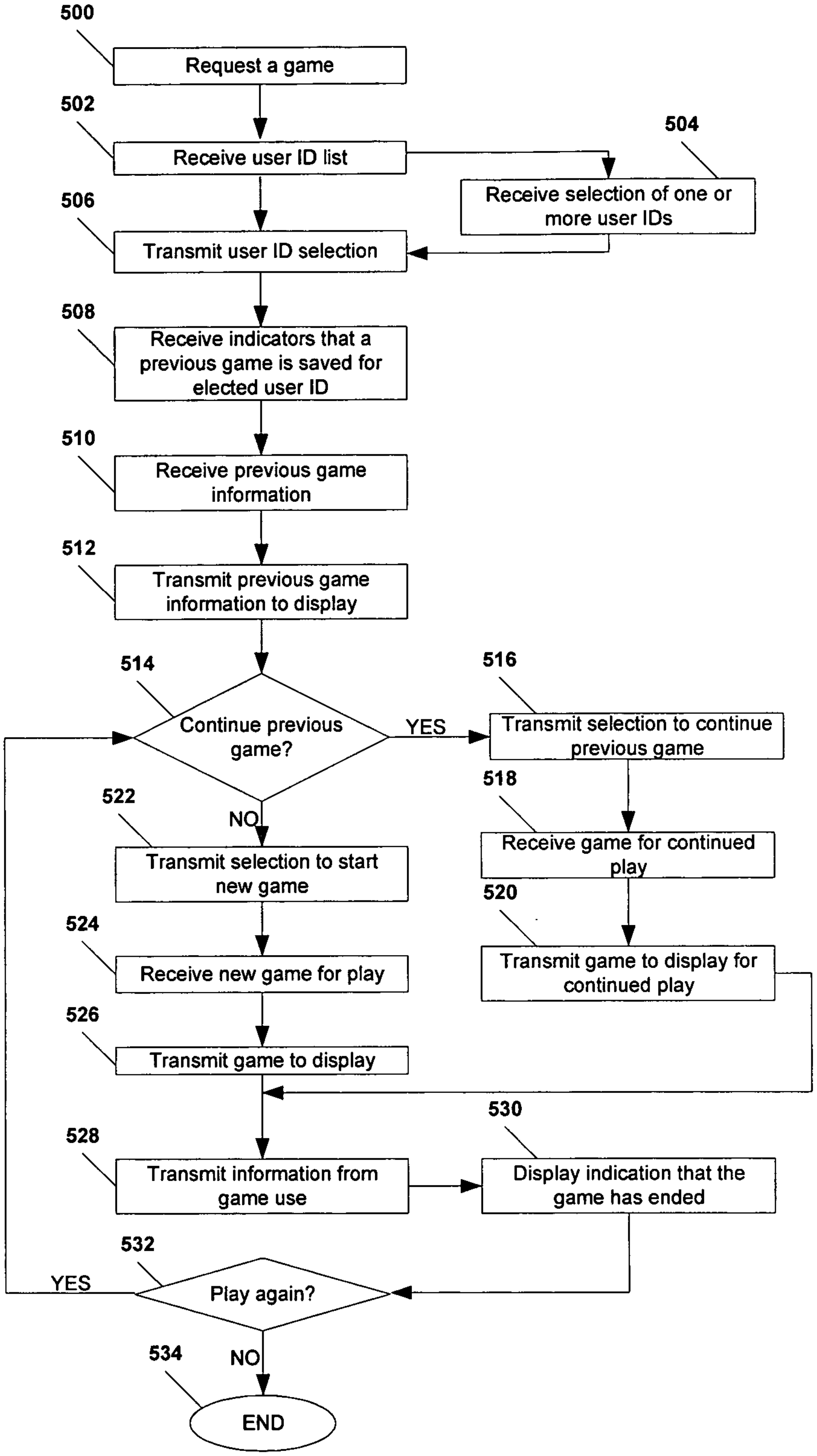
FIG. 5 is a flow diagram illustrating a method of receiving video games via an IPTV system.

Referring to FIG. 5, a method of receiving video games is shown. At block 500, the method includes issuing a request for a video game. In a particular embodiment, a set-top box device can issue the request to an application server over a network, such as an IPTV network. As shown at block 502, the set-top box device can receive a list of one or more user identities from the game application server for display at a display device. The user identities can be associated, for example, with an account that corresponds to the set-top box device that issued the request for the game. In an illustrative embodiment, the game application server can query an information store that stores user identities associated with user accounts that correspond to various set-top box data. For example, where the server and set-top box device communicate over an IP network, the information store can include IPTV account information that is associated with an IP address of the set-top box device, data identifying a twisted pair connected to the set-top box device, an alphanumeric identifier of the set-top box device, other data that is suitable for associating a set-top box device with a user account, or any combination of these.

At block 504, the set-top box device receives a selection of one or more of the listed user identities from a user. An example of the interaction and selection of a user identity is shown further in FIG. 6. The set-top box device can transmit the selection of the one or more user identities to the game application server, at block 506.

At block 508, the set-top box receives an indication that one or more previous games have been saved for the one or more selected user identities from the game application server. Moving to block 510, information relating to the previous game(s) is received. The information can include scores, levels, game states, or other information indicating results or progress associated with the one or more selected user identities that were transmitted at block 506. At block 512, the previous game information is transmitted to a display device, such as a television monitor.

Continuing to decision step 514, the set-top box device prompts the user with an option to continue one of the previous games. An example of the interaction and selection of a previous game is shown further in FIG. 7. When the user selects the option to continue a previous game, the method proceeds to block 516, and the selection to continue the previous game is transmitted to the server from the set-top box device. The method then proceeds to block 518 and the game is received at the set-top box device from the game application server for continued play. The game can then be displayed at the display device at block 520. The method ends at state 534.

Returning to decision step 514, if the user decides not to continue a previous game, the method proceeds to block 522 and the selection to start a new game is submitted from the set-top box device to the game application server. After a selection to start a new game is submitted by the set-top box device to the game application server, the game is received at the set-top box device for play at block 524. The set-top box can display the game at a display device, such as a television monitor, at block 526.

As shown at block 526, information, such as scores, levels, and game states, may be transmitted to the server from the set-top box device while the game is played, after the game is over, or both while the game is played and after the game is over. In a particular embodiment, the information can be stored by a game application in association with the user identities transmitted at block 506.

In a particular embodiment, once the game is over, the set-top box device can display an indication that the game has ended at block 530. The indication can be generated by the set-top box device or received by the set-top box device from the game application server. Moving to decision step 532, the user can be prompted to play the game again. The interaction and selection of the user with such a prompt is shown further in FIG. 8. If the user wants to play again, the method returns to decision step 514 and continues as described. In a particular embodiment, the user can continue the game that just ended. Returning to decision step 532, if the user does not want to play again, the method terminates at state 534.

Both new and previous games can be delivered from the game application server to the set-top box device in a variety of ways. For example, the game application can be operated at the game application server, such that game commands issued by a player to the set-top box device are received and executed at the game application server. In this embodiment, the set-top box device can operate essentially like a terminal that receives video content from the game application for display at a display device. Game information, such as scores and the like, are calculated and stored at the game application server.

Alternatively, a copy or version of a game application can be downloaded to the set-top box device, such that the operation of the game application and the execution of all commands received from the player occur at the set-top box device. In this alternative embodiment, game information is calculated at the set-top box device and transmitted to the game application server for storage or for transmission to an information store. The information can also be stored directly at the set-top box device prior to and/or after transmission to the game application server.

In another embodiment, the game application server can transmit only a portion of a game application to the set-top box device. For example, the game application server can transmit a single level of a mahjong game or a certain mission from a first-person shooter game. Commands received from a player for the portion of the game application are executed at the set-top box device. Once a player has completed the level or mission, performance data can be transmitted to the game application server, and the next level or mission can be downloaded to the set-top box device.

In a particular embodiment, the steps of the methods described herein are executed in the order shown by the figures. In alternative embodiments, the steps may be executed in alternative sequences.

Figure 6:
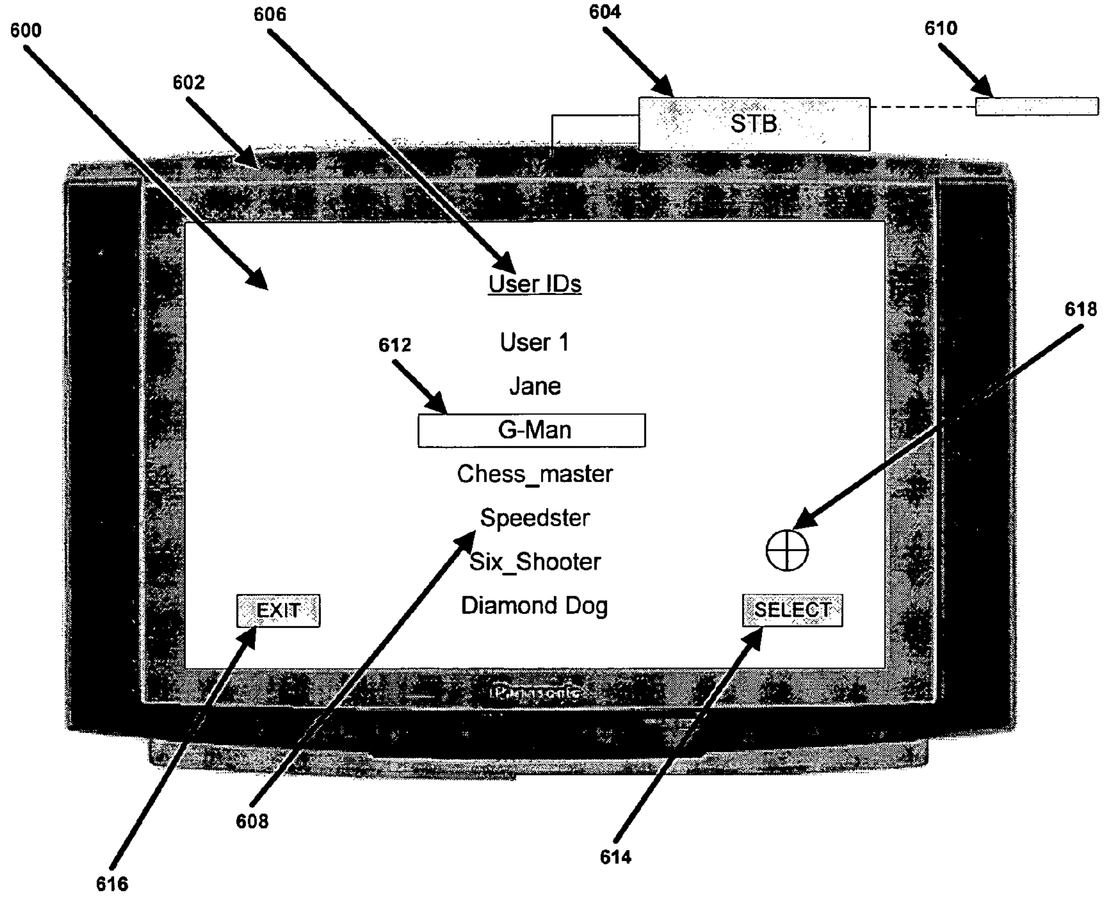
FIG. 6 is a diagram illustrating an embodiment of a user interface to receive video games via an IPTV system.

Referring to FIG. 6, an example of a graphical user interface 600 to receive video games via an IPTV system, e.g., the IPTV system 100 illustrated in FIG. 1, is shown. The graphical user interface 600 can be displayed on a display device, such as a television monitor 602, via a set-top box device 604. In a particular embodiment, the graphical user interface 600 includes a list of user identities 606. In this embodiment, a plurality of user identities 608 that are associated with the set-top box device 604 can be included in the list 606. A user can select one or more of the user identities 608 by manipulating a cursor. For example, the user can issue commands to the set-top box 604, using a remote control device 610, thereby manipulating a highlight bar 612 to settle on a particular user identity 608. The particular user identity 608 can then be selected. In an illustrative embodiment, the selection can be made by manipulating a pointer 618 to select a select soft button 614. If the user does not wish to select a user identity 608, the user can manipulate the pointer 618 to select an exit soft button 616.

Figure 7:
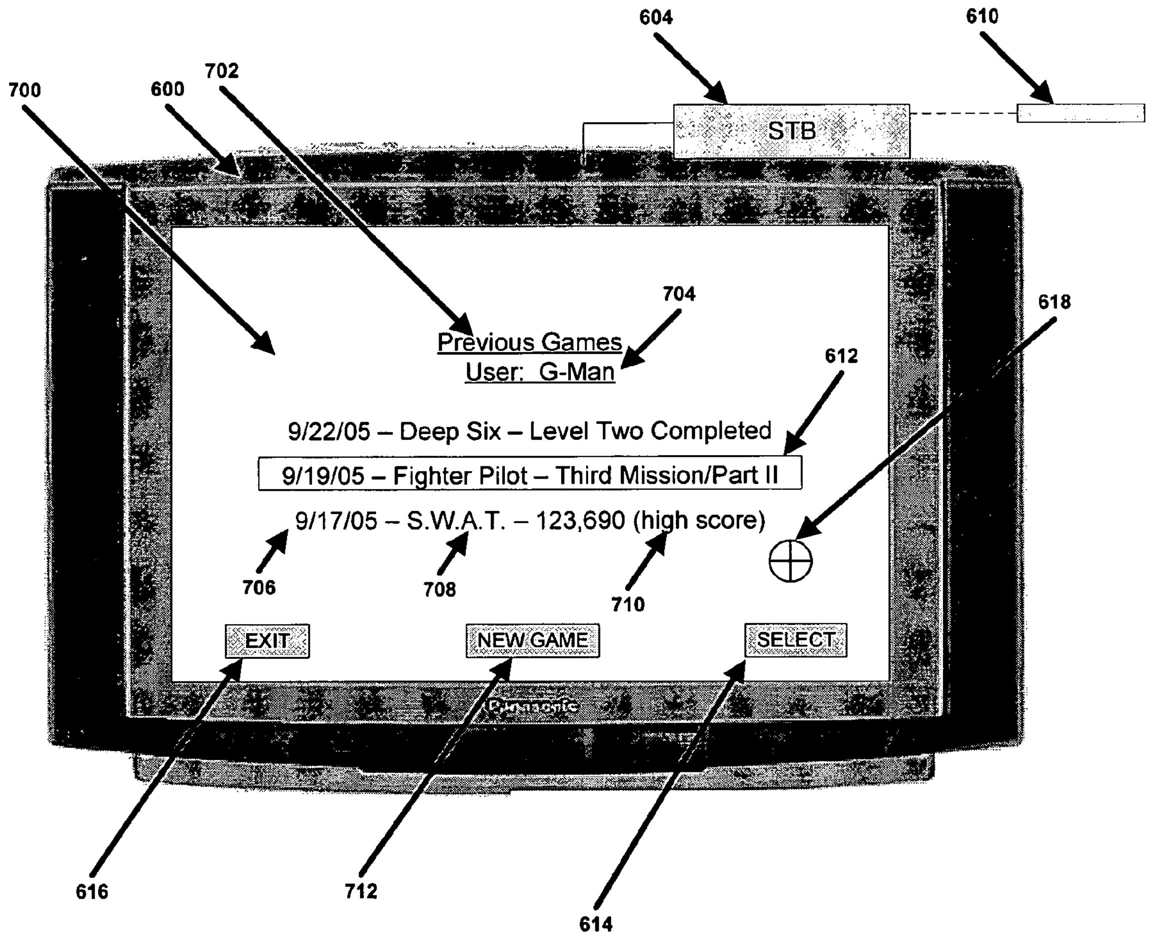
FIG. 7 is a diagram illustrating a second embodiment of a user interface to receive video games via an IPTV system.

Referring to FIG. 7, a second example of a graphical user interface 700 to receive video games is shown. The graphical user interface 700 can be displayed at the display device 602 via a set-top box device 604. In a particular embodiment, the graphical user interface 700 can be shown after a user identity is selected from the list of user identities 606 shown in FIG. 6. The graphical user interface 700 includes a list of previous games 702 that a selected user 704 has played. In this embodiment, a the list 702 can include a date 706 of a previous game, the name 708 of the game played on the date 706, and a previous game state 710. A user can select one of the previous games from the list 702 by manipulating a cursor. For example, the user can issue commands to the set-top box 604, using the remote control device 610, thereby manipulating the highlight bar 618 to settle on a particular previous game on the list 702. The previous game can then be selected from the list 702. In an illustrative embodiment, the selection can be made by manipulating a pointer 618 to select the select soft button 614. If the user does not wish to select a previous game, the user can manipulate the pointer 618 to select the exit soft button 616 or a new game soft button 712.

Figure 8:
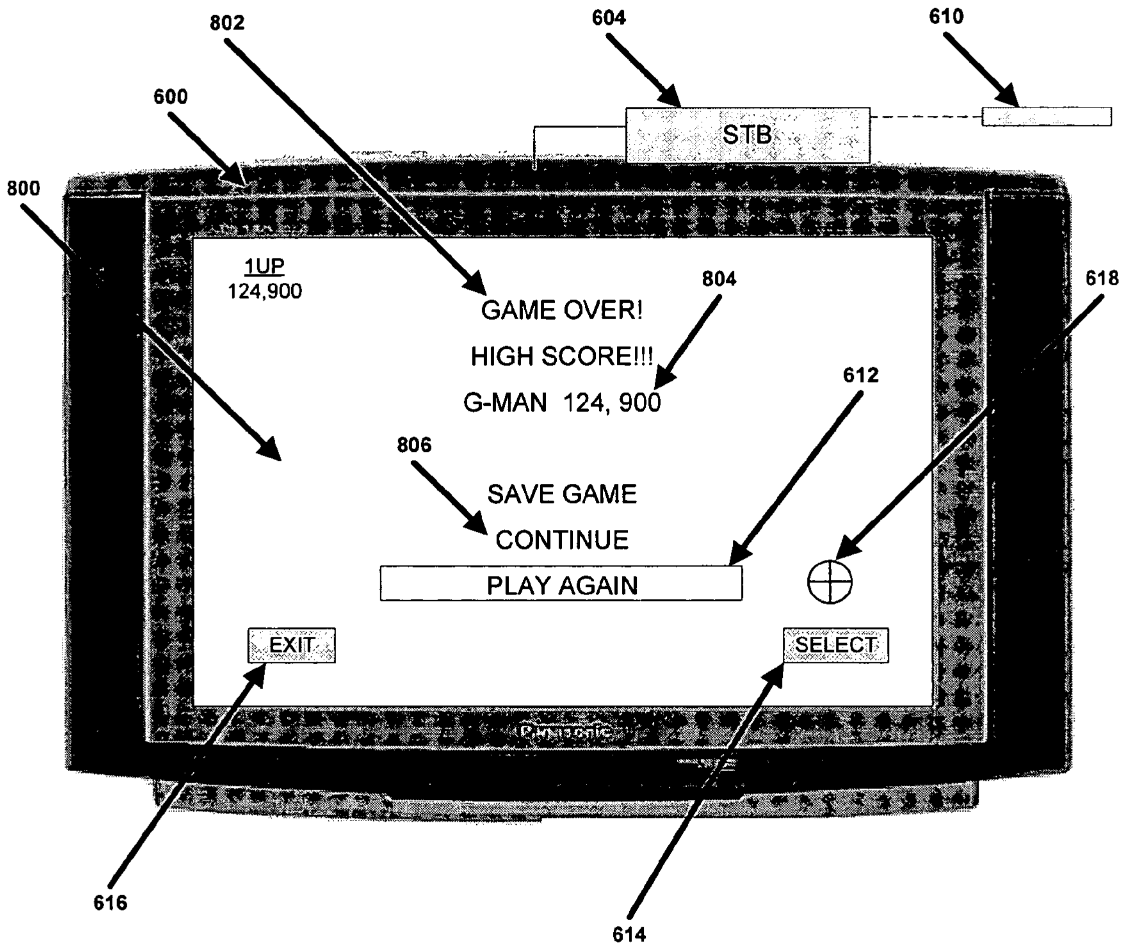
FIG. 8 is a diagram illustrating a third embodiment of a user interface to receive video games via an IPTV system.

Referring to FIG. 8, a third example of a graphical user interface 800 to receive video games is shown. The graphical user interface 800 can also be displayed at the display device 602. In a particular embodiment, the graphical user interface 800 includes a 'GAME OVER' notification 802. In this embodiment, if a high score was attained during a game, the high score can be shown in conjunction with the user identity of the user playing the game, as shown at 804. The graphical user interface 800 can also include one or more commands 806, which the user can select by manipulating a cursor. For example, the user can issue commands to the set-top box 604, using a remote control device 610, thereby manipulating a highlight bar 612 to settle on a particular command 806, such as PLAY AGAIN, CONTINUE, or SAVE GAME. The particular command 806 can then be selected. In an illustrative embodiment, the selection can be made by manipulating the pointer 618 to select the select soft button 614. If the user does not wish to select a command 806, the user can manipulate the pointer 618 to select the exit soft button 616.

Referring to FIG. 9, a fourth example of a graphical user interface 900 to receive video games is shown. The graphical user interface 900 can be displayed on the display device 602. In a particular embodiment, the graphical user interface 900 includes a high score list 902. The high score list 902 can include the name of a game 904, for which high scores are shown. The list can also include a plurality of user identities 904 and the high scores 906 attained by each user identity. In an illustrative embodiment, high scores for a single user can be shown. In another illustrative embodiment, high scores among all players can be shown. If the user wishes to exit the high score graphical user interface 900, the user can manipulate the pointer 618 to select the exit soft button 616.

In a particular embodiment, the graphical user interfaces 600, 700, 800 and 900 are separate graphical user interfaces. Alternatively, the graphical user interfaces 600, 700, 800 and 900 illustrate different screen shots of a single primary graphical user interface.

Figure 10:
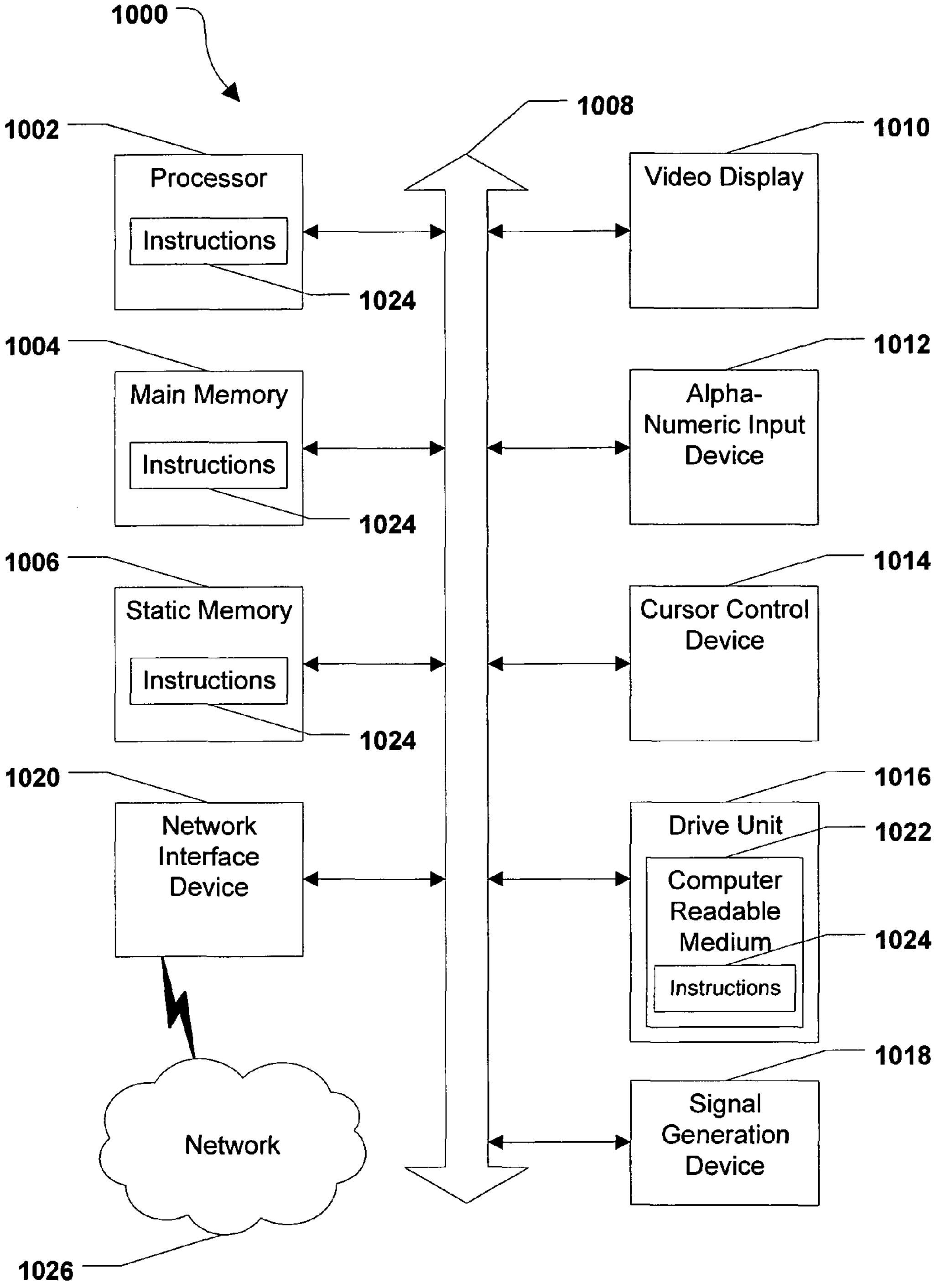
FIG. 10 is a diagram of an embodiment of a general computer system.

Referring to FIG. 10, an illustrative embodiment of a general computer system is shown and is designated 1000. The computer system 1000, or any portion thereof, may be embedded in a set-top box device, game application server, information store, or any combination of these, as shown in FIG. 1, and can include a set of instructions that can be executed to cause the computer system 1000 to perform any one or more of the methods or computer based functions disclosed herein. The computer system 1000, or a portion thereof, may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. Moreover, the computer system 1000 can include a main memory 1004 and a static memory 1006 that can communicate with each other via a bus 1008. As shown, the computer system 1000 may further include a video display unit 1010, such as a liquid crystal display (LCD), an organic light emitting diode (OLED), a flat panel display, a solid state display, or a cathode ray tube (CRT). Additionally, the computer system 1000 may include an input device 1012, such as a wireless keyboard, and a cursor control device 1014, such as a mouse. Further, the computer system 1000 can include a wireless input device 1015, e.g., a remote control device. The computer system 1000 can also include a disk drive unit 1016, a signal generation device 1018, such as a speaker or remote control, and a network interface device 1020. In one embodiment, the computer system 100 can be a set-top box device system that receives commands from a remote control and transmits the commands to a client-facing tier of an IPTV system via a private access network.

In a particular embodiment, as depicted in FIG. 10, the disk drive unit 1016 may include a computer-readable medium 1022 in which one or more sets of instructions 1024, e.g. software, can be embedded. Further, the instructions 1024 may embody one or more of the methods or logic as described herein. In a particular embodiment, the instructions 1024 may reside completely, or at least partially, within the main memory 1004, the static memory 1006, and/or within the processor 1002 during execution by the computer system 1000. The main memory 1004 and the processor 1002 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1024 or receives and executes instructions 1024 responsive to a propagated signal, so that a device connected to a network 1026 can communicate voice, video or data over the network 1026. Further, the instructions 1024 may be transmitted or received over the network 1026 via the network interface device 1020.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure described herein, the system and method disclosed can be used to deliver video games to set-top box devices over networks. The association of set-top box devices with user accounts and the association of previous game information with user identities included in such accounts allows users to receive robust previous game information and to continue previous game states, without the need for large memory stores at the set-top box device and without having to enter authentication information via their television monitors.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:

receiving, by a game server via an internet protocol television network, a request from a first set-top box device coupled to the internet protocol television network;

in response to receiving the request, accessing, by the game server, user account data associated with an internet protocol address of the first set-top box device, wherein the user account data is associated with a user account at a service provider of the internet protocol television network; and when the user account is associated with a user identity created at the first set-top box device, wherein the user identity is associated with a user:

retrieving, by the game server, previous game information associated with the user identity, wherein the previous game information includes a plurality of continuation points of a game, wherein each of the plurality of continuation points is associated with a particular previous execution of the game, and wherein each of the plurality of continuation points is associated with the user identity and with a plurality of additional players;

providing, by the game server, the previous game information to the first set-top box device via the internet protocol television network;

receiving, by the game server, information from the first set-top box device indicating selection by the user at the first set-top box device of a particular continuation point of the plurality of continuation points;

in response to receiving the information, sending, by the game server, a prompt to a plurality of second set-top box devices, each second set-top box device associated with a particular additional player of the plurality of additional players, wherein the prompt includes a selectable option to continue the game with the user based on the particular continuation point; and in response to receiving data indicating selection of the selectable option in the prompt at at least one of the plurality of second set-top box devices, enabling, by the game server, a first execution of the game between the user and one or more of the plurality of additional players, wherein the first execution is a continuation of the game at least partially based on the particular continuation point.

2. The method of claim 1, wherein the user account data includes a plurality of user identities, the plurality of user identities including the user identity, and wherein the method further comprises:

providing, by the game server, the plurality of user identities to the first set-top box device in response to accessing the user account data; and receiving, by the game server, a user selection indicating the user identity.

3. The method of claim 2, further comprising, when the user account is not associated with the user identity created at the first set-top box device:

sending, by the game server, a second request to the first set-top box device to create a new user identity for the user to be associated with the user account;

receiving, by the game server, the new user identity from the first set-top box device; and starting, by the game server, a new execution of the game and associating the new execution with the new user identity.

4. The method of claim 2, further comprising:

in response to the user selection, retrieving second game information associated with a second user identity of the plurality of user identities, wherein the user selection further indicates the second user identity, wherein the previous game information associated with the user identity is retrieved by the game server in response to the user selection, wherein the second game information includes a second plurality of continuation points of the game; and providing, by the game server, the second game information to the first set-top box device.

5. The method of claim 1, further comprising determining, by the game server, whether the first execution is over.

6. The method of claim 5, further comprising, after determining that the first execution is over, determining, by the game server, whether a score of the first execution of the game is a high score of a plurality of scores of previous executions of the game, each of the plurality of scores associated with the user.

7. The method of claim 6, further comprising storing, by the game server, the score with the user identity when the score is the high score.

8. The method of claim 7, further comprising storing, by the game server, a continuation point associated with the first execution of the game, the continuation point associated with the user identity.

9. The method of claim 8, further comprising sending, by the game server, data regarding the continuation point and the previous game information to a display device.

10. The method of claim 6, further comprising, after determining that the first execution is over, causing, by the game server, a display device to display a second selectable option to store the score associated with the user identity.

11. The method of claim 1, wherein the request is received from the first set-top box device via a client-facing tier switch associated with a client-facing tier of the internet protocol television network, wherein the client-facing tier switch receives the request via a private access network, and wherein the game server accesses the user account data from an application tier of the internet protocol television network via the client-facing tier switch.

12. The method of claim 11, wherein the game server provides the previous game information to the first set-top box device by sending the previous game information to a terminal server of the client-facing tier, and wherein the terminal server provides the previous game information to the first set-top box device across the private access network via the client-facing tier switch.

13. A method comprising:

receiving, by a game server of an internet protocol television network, a request for a game from a first set-top box device associated with a user, wherein the first set-top box device is coupled to the internet protocol television network;

in response to receiving the request, accessing, by the game server, user account data associated with an internet protocol address of the first set-top box device, wherein the user account data is associated with a user account at a service provider of the internet protocol television network;

identifying, by the game server, a first user identity associated with the user account, wherein the first identity corresponds to the user;

receiving, by the game server, a selection to play the game in an online room with a plurality of additional players;

retrieving, by the game server, previous game information of a previous execution of the game associated with the first user identity and with additional user identities associated with the plurality of additional players;

providing, by the game server, the previous game information to the first set-top box device via the internet protocol television network;

receiving, by the game server, information from the first set-top box device indicating a selection of the previous game information at the first set-top box device;

in response to receiving the information, sending, by the game server, a prompt to a plurality of second set-top box devices, each second set-top box device associated with a particular additional player of the plurality of additional players, wherein the prompt includes a selectable option to continue the game with the user based on the previous game information; and after sending the prompt to the plurality of second set-top box devices, selectively enabling a first execution of the game between the user and the plurality of additional players, wherein the first execution of the game is enabled in response to receiving data indicating selection of the selectable option in the prompt at each of the plurality of second set-top box devices, and wherein the first execution is a continuation of the game executed at least partially based on the previous game information.

14. The method of claim 13, wherein the previous game information comprises a first game performance indicator associated with the first user identity and a second game performance indicator associated with each of the plurality of additional players.

15. The method of claim 13, wherein the previous game information is displayed at a plurality of display devices, each of the plurality of display devices coupled to one of the second set-top box devices.

16. The method of claim 13, further comprising determining, by the game server, whether each of the plurality of additional players previously played the game in the online room.

17. The method of claim 13, wherein the additional user identities are created at the plurality of second set-top box devices, each of the second set-top box device is associated with a particular second user account at the service provider of the internet protocol television network.

18. A method comprising:

sending a request via an internet protocol television network from a first set-top box device to a game server, wherein the request includes an internet protocol address of the first set-top box device, wherein the internet protocol address is used by the game server to access user account data that is associated with the first set-top box device, and wherein the user account data is associated with a user account at a service provider of the internet protocol television network; and when the user account is associated with at least one user identity created at the first set-top box device, wherein the at least one user identity is associated with a user:

receiving previous game information of a previous execution of a game, wherein the previous game information is received from the game server via the internet protocol television network, wherein the previous game information is associated with the at least one user identity and with a plurality of additional user identities, wherein the plurality of additional user identities is associated with a plurality of additional players, and wherein the previous game information includes a date of the previous execution of the game;

displaying a first option and the date of the previous execution at a display device, wherein the first option is selectable to invite a plurality of second set-top box devices to play the game, wherein each second set-top box device is associated with a particular additional player of the plurality of additional players; and sending information indicating a selection of the first option by the user at the first set-top box device, wherein the information indicating the selection causes the game server to send a prompt to the plurality of second set-top box devices, wherein the prompt includes a selectable option to continue the game with the user based on the previous game information, wherein the prompt includes the date of the previous execution, wherein selection of the selectable option in the prompt at a second set-top box device of the plurality of second set-top box devices causes the game server to enable a first execution of the game between the user and a corresponding additional player of the plurality of additional players, and wherein the first execution is a continuation of the game at least partially based on the previous game information.

19. The method of claim 18, further comprising receiving a copy of the game, wherein the previous game information comprises a previous continuation point, wherein the copy of the game comprises data to provide a continuation of the game based on the previous continuation point.

20. The method of claim 18, wherein the previous game information comprises a game performance indicator for each of the plurality of additional players.

21. An apparatus comprising:

a network interface configured to couple to an internet protocol television network;

a processor; and a memory device accessible to the processor, the memory device including instructions that, when executed by the processor, cause the processor to perform operations comprising:

receiving a request for a game from a first set-top box device via the internet protocol television network;

in response to receiving the request, accessing user account data associated with an internet protocol address of the first set-top box device, wherein the user account data is associated with a user account at a service provider of the internet protocol television network; and when the user account is associated with at least one user identity created at the first set-top box device, wherein the at least one user identity is associated with a user:

retrieving previous game information of a previous execution of the game, the previous game information associated with the at least one user identity and with a plurality of additional user identities, wherein the plurality of additional user identities is associated with a plurality of additional players, and wherein the previous game information includes a date of the previous execution of the game;

receiving information from a first set-top box device, the information indicating a selection of the previous game information by the user at the first set-top box device;

in response to receiving the information, sending a prompt to a plurality of second set-top box devices, each second set-top box device associated with a particular additional player of the plurality of additional players, wherein the prompt includes a selectable option to continue the game with the user based on the previous game information; and in response to receiving data indicating selection of the selectable option in the prompt at at least one second set-top box device of the plurality of second set-top box devices, enabling a first execution of the game between the user and a corresponding additional player of the plurality of additional players, wherein the first execution is a continuation of the game at least partially based on the previous game information.

22. The apparatus of claim 21, wherein the operations further comprise providing the game to the first set-top box device.

23. The apparatus of claim 22, wherein the previous game information is displayed at a display device coupled to the first set-top box device.

24. The apparatus of claim 21, wherein the operations further comprise providing the previous game information to the first set-top box device via the internet protocol television network.

* * * * *